March 12, 1935. J. CATARAU 1,993,990
ARTIFICIAL BAIT
Filed March 7, 1933
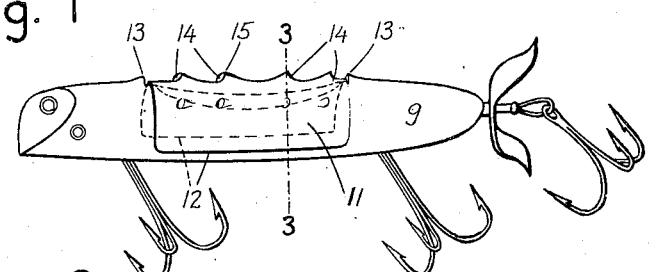
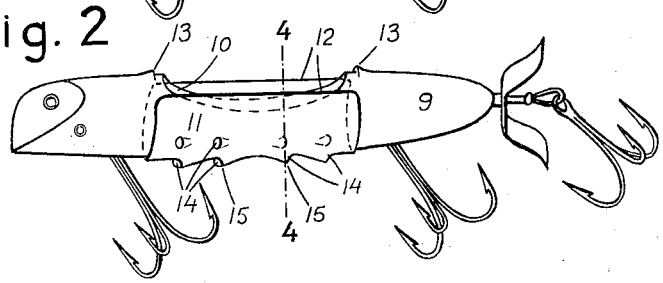
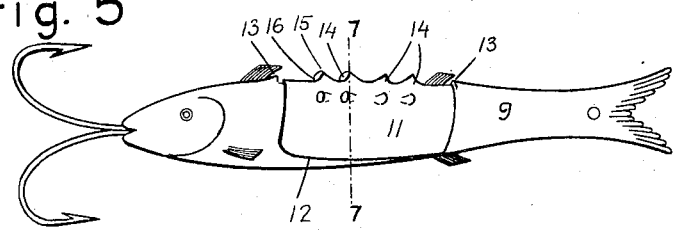
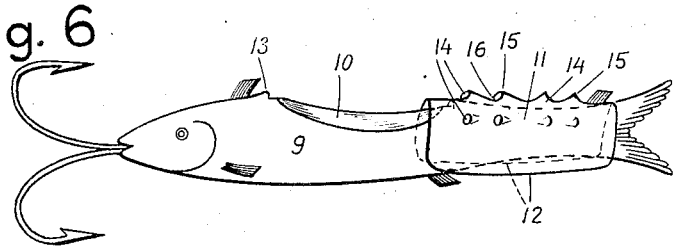
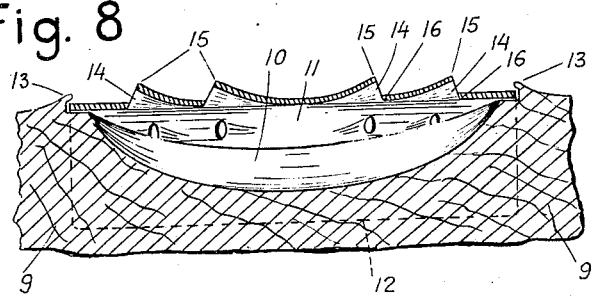
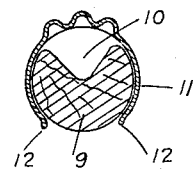
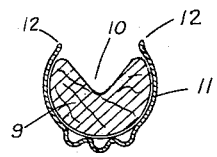
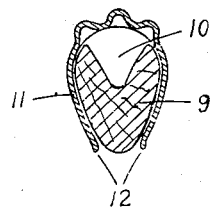
Jules Catarau
INVENTOR Patented Mar. 12, 1935

1,993,990

UNITED STATES PATENT OFFICE 1,993,990

ARTIFICIAL BAIT

Jules Catarau, Seattle, Wash.

Application March 7, 1933, Serial No. 659,947

4 Claims. (Cl. 43—46)

This invention relates to artificial bait commonly known as "plug", "spoon", "jigger", etc., and the object of the invention is to provide such artificial bait with scent oozing means in order to increase the alluring effect of said bait.

In pursuing the above object the aim is to construct said scent oozing means in the simplest way and without binding said means to a particular body of artificial bait.

A further aim is to construct said means on the body of any artificial bait without marring the optical alluring effect of said bait.

The drawing accompanying the application illustrates a novel construction in the art, and Figure 1 of said drawing is a perspective view of a lure body provided with scent oozing means in accordance with the invention.

Figure 2 is a perspective view of a lure body provided with scent oozing means in accordance with the invention, and—by comparison with Figure 1—illustrates the mode of operation of the device on a cigar-shaped lure body.

Figure 3 is a cross-section of broken line 3—3 of Fig. 1.

Figure 4 is a cross-section of broken line 4—4 of Fig. 2.

Figure 5 is a side elevation of a jigger-lure body provided with scent oozing means in accordance with the invention.

Figure 6 is a side elevation of a minnow-like body provided with scent oozing means, and—by comparison with Figure 5—illustrates the mode of operation of the device on a flat and tapered lure body.

Figure 7 is a cross-section of broken line 7—7 of Fig. 5.

Figure 8 is a longitudinal transversal cross-section of Figure 1.

Similar numerals refer to similar parts throughout the drawing.

As plainly illustrated by the drawing thereof, a depression 10 is formed on the surface of the lure body 9.

Said depression 10 has its outset—the outer edge—not less than the incurved walls forming said depression; the depression must be devoid of inaccessible recess in which scent material will stick and decay to the greatest disadvantage in fishing for any species of fish.

A tubular member 11 is provided and snugly mounted on the lure body 9.

Said member 11 envelopes circumferentially the lure body 9, and is joined together at its longitudinal edges 12 12 as in a stove pipe or otherwise.

But preference is given to said edges 12 12 being reasonably spaced apart from each other to ease manufacturing of member 11 and in accordance with reasons that will become apparent hereinafter.

Said member 11 is fitted snugly over the surface of the lure body to slide circularly (see Figures 1, 2, 3, and 4) or lengthwisely (see Figures 5 and 6) over the recess 10 and thereby to prevent the washing away of scent material inserted in said recess.

Protuberant members 13 13 are provided on the lure body 9 as means to retain the member 11 in its position over the recess 10 when the recess is loaded with scent material and the lure body travels in the water.

On a straight or cigar-shaped body the member 11 slides over the scent containing recess circularly or lengthwise, while on a flat minnow-shaped body the member 11 slides over the recess 10 lengthwise relative to the longitudinal axis of the lure body, as shown in the Figures 5, 6, and 7.

The member 11 is endued with the property of resiliency so that it may be taken apart from the lure body, cleaned from decaying materia, and remounted on the lure body without marring its fit around the lure body and without dismounting line and hook paraphernalia which is much complicated with some types of artificial bait.

Furthermore, the member 11 is formed with a plurality of openings 14 through which water circulates in and out and thereby exudes the scent material.

Said openings 14 have their orifice-margins formed with half-portions 15—the portions nearest to the middle of the member 11—rising above the other half-portions 16—the portions nearest to the ends of the member 11.

The rising portions 15 scoop the water with each displacement of the lure body when trolling or angling and increase considerably the volume of water contaminating its molecules with scenting materia from within the recess 10 and thereby enable the artificial bait to emanate a strongest effluvium.

I claim:

1. In artificial bait, a lure body having a concave surface intermediate its ends to receive a scent material, and a curved plate member snugly mounted around said lure body to slide over said concave surface and to enclose the scent material, said plate member having a plurality of openings to facilitate oozing of the scent material.

2. In artificial bait, a lure body having a concave surface intermediate its ends to receive a scent material, a plate member formed to fit the surface of said lure body and to slide over said concave surface to enclose the scent material, and a means provided to retain said plate member over said concave surface, said plate having a plurality of openings to facilitate oozing of the scent material.

3. In artificial bait, a lure body including a scent container, said container having outer walls, said walls having a plurality of openings to exude the scent material, said openings formed with half-portions of their orifice-edges rising above the level of the other half-portions of said orifice-edges, for the purposes set forth.

4. In artificial bait, a lure body having on its periphery intermediate the ends a depression to receive a scent material, said depression having its outset not less than the space between the incurved walls forming said depression, and a plate member mounted on said lure body to slide peripherally over said depression to enclose the scent material, said plate member having a plurality of openings through its wall to facilitate oozing of the scent material.

JULES CATARAU.